US012617379B2

(12) United States Patent
Taylor et al.

(10) Patent No.: US 12,617,379 B2
(45) Date of Patent: May 5, 2026

(54) VEHICLE OPERATION WITH OPERATOR MONITORING

(71) Applicant: Ford Global Technologies, LLC, Dearborn, MI (US)

(72) Inventors: Alexandra Taylor, Harbor Springs, MI (US); Kevin Wegienka, Novi, MI (US); Ali Hassani, Ann Arbor, MI (US); Justin Miller, Berkley, MI (US); Gerald H. Engelman, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 18/522,411

(22) Filed: Nov. 29, 2023

(65) Prior Publication Data
US 2025/0171000 A1 May 29, 2025

(51) Int. Cl.
B60T 8/174 (2006.01)
B60T 17/22 (2006.01)
G06V 20/59 (2022.01)

(52) U.S. Cl.
CPC .............. B60T 8/174 (2013.01); B60T 17/22 (2013.01); G06V 20/597 (2022.01)

(58) Field of Classification Search
CPC ........ B60T 8/174; B60T 17/22; G06V 20/597
See application file for complete search history.

(56) References Cited

U.S. PATENT DOCUMENTS

| | | | | |
|---|---|---|---|---|
| 9,235,211 B2 * | 1/2016 | Davidsson | ............ | B60W 50/14 |
| 10,209,708 B2 * | 2/2019 | Hoye | .................. | B60W 50/082 |
| 10,787,123 B1 * | 9/2020 | Kim | ..................... | B60K 28/066 |
| 12,122,408 B2 * | 10/2024 | Oba | .................. | G01C 21/3697 |
| 2020/0257308 A1 * | 8/2020 | Herman | .............. | G05D 1/0231 |
| 2020/0319635 A1 * | 10/2020 | Andres | ............... | G05D 1/0212 |
| 2021/0309244 A1 | 10/2021 | Kim et al. | | |
| 2022/0024462 A1 | 1/2022 | Sekine et al. | | |
| 2023/0060300 A1 * | 3/2023 | Rosenbaum | ...... | B60W 60/0059 |

FOREIGN PATENT DOCUMENTS

CN 115214723 A 10/2022

OTHER PUBLICATIONS

Pyeon et al., "Deep Learning-Based Driver's Hands on/off Prediction System Using In-Vehicle Data", Sensors 2023, 23, 1442. https://doi.org/10.3390/s23031442.

* cited by examiner

*Primary Examiner* — Sizo B Vilakazi
(74) *Attorney, Agent, or Firm* — Frank Lollo; Brooks Kushman P.C.

(57) ABSTRACT

A system including a computer having a processor and a memory. The memory includes instructions executable by the processor to determine an operator reengagement score based on sensor data including multiple perception factors and multiple controllability factors. An operator reengagement delay is adjusted based on the operator reengagement score and a vehicle component is actuated upon expiration of the operator reengagement delay.

20 Claims, 4 Drawing Sheets

SERVER 118

WAN 116

VEHICLE 102

126

124

122

150

COMM. COMPONENT 114

HMI 112

COMPONENTS 110

COMPUTER 104

SENSORS 108

106

100

VEHICLE OPERATION WITH OPERATOR MONITORING

BACKGROUND

Vehicles, e.g., in the context of advanced driver assist systems (ADAS) or the like, employ some form of steering wheel engagement verification. Many ADAS features are hands-on and designed to assist in longitudinal and lateral control, e.g., lane-centering, while an operator's hands are on the steering wheel. Furthermore, hands-free features can encounter scenarios that call for operator reengagement.

DETAILED DESCRIPTION

Figure 1:
FIG. 1 is a block diagram of an example vehicle.

This disclosure provides techniques for using perception and controllability context as input to an operator reengagement timing strategy included in controlling vehicle features and/or systems. Perception factors can include path confidence, road type, and adjacent vehicles and controllability factors can include lateral acceleration, road curvature, speed relative to limit, and operator engagement, for example. A computer can include programming to determine an operator reengagement score based on sensor data including the perception factors and the controllability factors. An operator reengagement delay that provides input to control one or more vehicle features and/or systems can be adjusted based on the reengagement score. For example, the operator reengagement delay can be changed in proportion to a change in the reengagement score between a minimum delay and a maximum delay. Upon expiration of the operator reengagement delay the computer can execute programming to actuate features and/or systems, for example, a notification for the operator to place one or more hands in contact with the steering wheel. In an example, when conditions allow, e.g., low-speeds and straight road, the operator reengagement delay can be increased. In other circumstances, e.g., curved roads and increased speed, the operator reengagement delay can be reduced or set to zero, triggering an immediate reengagement notification or actuation of other vehicle components, such as a vehicle braking system.

Disclosed herein is a system including a computer having a processor and a memory. The memory includes instructions executable by the processor to determine an operator reengagement score based on sensor data including multiple perception factors and multiple controllability factors. The instructions can include instructions to adjust an operator reengagement delay based on the operator reengagement score and actuate a vehicle component upon expiration of the operator reengagement delay.

The instructions to determine the operator reengagement score can include instructions to multiply each of the multiple perception factors by a corresponding perception weight, and then multiply the weighted perception factors together.

The perception factors can include one or more of path confidence, road type, and adjacent vehicles.

The instructions to determine the operator reengagement score can include instructions to multiply each of the multiple controllability factors by a corresponding controllability weight, and then multiply the weighted controllability factors together.

The controllability factors can include one or more of lateral acceleration, road curvature, speed relative to limit, and operator engagement.

The instructions to adjust the operator reengagement delay can include instructions to change the operator reengagement delay in proportion to a change in the operator reengagement score between a minimum delay and a maximum delay.

The instructions to adjust the operator reengagement delay can include instructions to set the operator reengagement delay to zero when the operator reengagement score is below a threshold value.

The instructions can further include instructions to receive an indication that spoofing is detected and in response to the indication set the operator reengagement delay to the minimum delay.

The instructions to determine the operator reengagement score can include instructions to multiply each of the multiple perception factors by a corresponding perception weight, multiply each of the multiple controllability factors by a corresponding controllability weight, and multiply the weighted perception factors and the weighted controllability factors together.

The perception weights and the controllability weights can be determined empirically.

The instructions to adjust the operator reengagement delay can include instructions to change the operator reengagement delay in proportion to a change in the operator reengagement score between a minimum delay and a maximum delay.

The actuated vehicle component can be an operator reengagement indicator.

The actuated vehicle component can be a vehicle brake.

Disclosed herein is a method including determining an operator reengagement score based on sensor data including multiple perception factors and multiple controllability factors. The method can include adjusting an operator reengagement delay based on the operator reengagement score and actuating a vehicle component upon expiration of the operator reengagement delay.

Determining the operator reengagement score can include multiplying each of the multiple perception factors by a corresponding perception weight, and then multiplying the weighted perception factors together.

Determining the operator reengagement score can include multiplying each of the multiple controllability factors by a corresponding controllability weight, and then multiplying the weighted controllability factors.

Adjusting the operator reengagement delay can include changing the operator reengagement delay in proportion to a change in the reengagement score between a minimum delay and a maximum delay.

The actuated vehicle component can be an operator reengagement indicator.

The method can further comprise receiving an indication that spoofing is detected and in response to the indication setting the delay to the minimum delay.

Adjusting the operator reengagement delay can include setting the delay to zero when the reengagement score is below a threshold value.

FIG. 1 is a block diagram of an example vehicle. As shown in FIG. 1, system 100 includes a vehicle 102, that includes a computer 104 that is communicatively coupled, via a vehicle network 106, to various elements including sensors 108, subsystems or components 110, such as steering, propulsion, braking, human machine interface (HMI) 112, and communication component 114. Computer 104, and server 118 discussed below, include a processor and a memory. A memory of computer 104, such as those described herein, includes one or more forms of non-transitory media readable by computer 104, and can store instructions executable by computer 104 for performing various operations, such that the vehicle computer is configured to perform the various operations, including those disclosed herein.

For example, computer 104 can include a generic computer with a processor and memory as described above and/or may comprise an electronic control unit (ECU) or a controller for a specific function or set of functions, and/or a dedicated electronic circuit including an ASIC (application specific integrated circuit) that is manufactured for a particular operation, (e.g., an ASIC for processing data from sensors and/or communicating data from sensors 108). In another example, computer 104 may include an FPGA (Field-Programmable Gate Array), which is an integrated circuit manufactured to be configurable by a user. In examples, a hardware description language such as VHDL (Very High-Speed Integrated Circuit Hardware Description Language) may be used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected or coupled to the FPGA circuit.) In some examples, a combination of processor(s), ASIC(s), and/or FPGA circuits may be included in computer 104. Further, computer 104 may include a plurality of computers in the vehicle (e.g., a plurality of ECUs or the like) operating together to perform operations ascribed herein to the computer 104.

A memory of computer 104 can include any type, such as hard disk drives, solid state drives, or any volatile or non-volatile media. The memory can store the collected data transmitted by sensors 108. The memory can be a separate device from computer 104, and computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 104, for example, as a memory internal to computer 104.

Computer 104 can include or access instructions to operate one or more components 110 such as vehicle brakes, propulsion (e.g., one or more of an internal combustion engine, electric motor, hybrid engine, etc.), steering, climate control, interior and/or exterior lights, infotainment, navigation etc., as well as to determine whether and when computer 104, as opposed to a human operator, is to control such operations. Computer 104 can include or be communicatively coupled, e.g., via vehicle network 106, to more than one processor, which can be included in components 110 such as sensors 108, ECUs or the like included in the vehicle for monitoring and/or controlling various vehicle components, e.g., a powertrain controller, a brake controller, a steering controller, etc.

Vehicle sensors 108 can further include torque sensor 122, which operates to measure torque (i.e., a torsion moment) applied to a steering element, e.g., steering wheel 124, as an operator applies a rotational force to the steering wheel to control the heading of vehicle 102. In an example, torque sensor 122 is mounted to steering column 126 to measure torque in the range of 0.02 Newton meters (N-m) to 0.2 N-m. Torque sensor 122 can include a calibrated strain gauge, for example, to provide a voltage signal that is proportional to torque applied to steering wheel 124. In an example, torque sensor 122 is capable of measuring torque at all times, or at virtually all times, that an operator steers vehicle 102 with at least one hand resting on steering wheel 124 as vehicle 102 proceeds along path 150. In response to an operator removing their hands from steering wheel 124, torque sensor 122 measures zero torque, or other negligible amount of torque, conveyed to steering column 126. It is noted that torque sensor 122 can measure a torque corresponding to other objects placed into contact with steering wheel 124, such as various foreign objects, e.g., laptop computers, water bottles, coffee containers, etc. It is noted that although FIG. 1 shows a steering wheel, techniques described herein can apply to steering elements other than a steering wheel of a vehicle, such as a joystick, an aircraft control yoke, etc.

Steering wheel 124 can include, e.g., mounted in, on, or proximate to the steering wheel 124, additional sensors 108 to determine whether an operator's hand is in contact with steering wheel 124, such as a capacitive sensor. Such sensors can operate to register a change in self-capacitance in response to a hand of an operator being proximate with a capacitive sensor mounted on steering wheel 124. However, it is also noted that capacitance, e.g., self-capacitance (such as capacitance of single capacitive sensor), mutual capacitance (such as capacitance between two or more capacitive sensors), etc., may be affected by the proximity of certain foreign objects, such as water bottles, coffee containers, etc. In an example, other sensors may be positioned on steering wheel 124, such as sensors to measure force, torque, temperature, and other properties in a global or local coordinate reference position and/or orientation that may relate directly or indirectly to operator input to steering wheel.

Computer 104 may be generally arranged for communications on vehicle network 106 that can include a communications bus in the vehicle, such as a controller area network CAN or the like, and/or other wired and/or wireless mechanisms. Vehicle network 106 corresponds to a communications network, which can facilitate exchange of messages between various onboard vehicle devices, e.g., sensors 108, components 110, computer 104 and a computer onboard vehicle 102. Computer 104 can be generally programmed to send and/or receive, via vehicle network 106, messages to and/or from other devices in vehicle, e.g., any or all of ECUs, sensors 108, actuators, components 110, communications module, HMI 112. For example, various component 110 subsystems (e.g., components 110) can be controlled by respective ECUs.

Further, in implementations in which computer 104 actually comprises a plurality of devices, vehicle network 106 may be used for communications between devices represented as computer 104 in this disclosure. For example, vehicle network 106 can provide a communications capability via a wired bus, such as a CAN bus, a LIN bus, or can utilize any type of wireless communications capability. Vehicle network 106 can include a network in which messages are conveyed using any other wired communication technologies and/or wireless communication technologies, e.g., Ethernet, Wi-Fi®, Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices onboard a vehicle. For example, vehicle network 106 can include a CAN bus, in which some in-vehicle sensors and/or components communicate via a CAN bus, and a wired or wireless local area network in which some device in vehicle communicate according to Ethernet, Wi-Fi®, and/or Bluetooth communication protocols.

Vehicle 102 typically includes a variety of sensors 108 in addition to torque sensors, capacitive sensors, and other sensors related to determining whether an operator has placed a hand into contact with steering wheel 124. Sensors 108 can include a suite of devices that can obtain one or more measurements of one or more physical phenomena. Some of sensors 108 detect variables that characterize the operational environment of the vehicle, e.g., vehicle speed settings, vehicle towing parameters, vehicle braking parameters, engine torque output, engine and transmission temperatures, battery temperatures, vehicle steering parameters, etc. Some of sensors 108 detect variables that characterize the physical environment of vehicle 102, such as ambient air temperature, humidity, weather conditions (e.g., rain, snow, etc.), parameters related to the inclination or gradient of a road or other type of path on which the vehicle is proceeding, etc. In examples, sensors 108 can operate to detect the position or orientation of the vehicle utilizing, for example, signals from a satellite positioning system (e.g., global positioning system or GPS); accelerometers, such as piezo-electric or microelectromechanical systems MEMS; gyroscopes such as rate, ring laser, or fiber-optic gyroscopes; inertial measurement units IMU; and magnetometers. In examples, sensors 108 can include sensors to detect aspects of the environment external to vehicle 102, such as radar sensors, scanning laser range finders, cameras, etc. Sensors 108 can also include light detection and ranging (LIDAR) sensors, which operate to detect distances to objects by emitting a laser pulse and measuring the time of flight for the pulse to travel to the object and back. Sensors 108 may include a controller and/or a microprocessor, which execute instructions to perform, for example, analog-to-digital conversion to convert sensed analog measurements and/or observations to input signals that can be provided to computer 104, e.g., via vehicle network 106.

Computer 104 can be configured for utilizing vehicle-to-vehicle (V2V) communications via communication component 114 and/or may interface with devices outside of the vehicle, e.g., through wide area network (WAN) 116 via V2V communications. Computer 104 can communicate outside of vehicle 102, such as via vehicle-to-infrastructure (V2I) communications, vehicle-to-everything (V2X) communications, or V2X including cellular communications C-V2X, and/or wireless communications cellular dedicated short-range communications DSRC, etc. Communications outside of vehicle 102 can be facilitated by direct radio frequency communications and/or via network server 118. Communications component 114 can include one or more mechanisms by which computer 104 communicates with vehicles outside of vehicle 102, including any desired combination of wireless, e.g., cellular, wireless, satellite, microwave, radio frequency communication mechanisms and any desired network topology or topologies when a plurality of communication mechanisms are utilized.

Vehicle 102 can include HMI 112, e.g., one or more of an infotainment display, a touchscreen display, a microphone, a speaker, a haptic device, etc. A user, such as the operator of vehicle 102, can provide input to devices such as computer 104 via HMI 112. HMI 112 can communicate with computer 104 via vehicle network 106, e.g., HMI 112 can send a message including the user input provided via a touchscreen, microphone, a camera that captures a gesture, etc., to computer 104, and/or can display output, e.g., via a display, speaker, etc. Further, operations of HMI 112 can be performed by a portable user device (not shown) such as a smart phone or the like in communication with computer 104, e.g., via Bluetooth or the like.

WAN 116 can include one or more mechanisms by which computer 104 may communicate with server 118. Server 118 can include an apparatus having one or more computing devices, e.g., having respective processors and memories and/or associated data stores, which may be accessible via WAN 116. In examples, vehicle 102 could include a wireless transceiver (i.e., transmitter and/or receiver) to send and receive messages outside of vehicle 102. Accordingly, the network can include one or more of various wired or wireless communication mechanisms, including any desired combination of wired e.g., cable and fiber and/or wireless, e.g., cellular, wireless, satellite, microwave, and radio frequency communication mechanisms and any desired network topology or topologies when multiple communication mechanisms are utilized. Exemplary communication networks include wireless communication networks, e.g., using Bluetooth, Bluetooth Low Energy BLE, IEEE 802.11, V2V or V2X such as cellular V2X CV2X, DSRC, etc., local area networks and/or wide area networks 116, including the Internet.

In an example implementation, computer 104 can obtain an image of a portion of a vehicle 102 interior that may include an operator seated in the operator's seat of vehicle 102 utilizing a camera mounted on the dashboard of the vehicle. In some examples, the image of the operator includes the operator's head, neck, shoulders, chest, and/or upper arms, for example, but may exclude an image of the operator's hands. Accordingly, suitable image processing programming executed by computer 104 can extract parameters of the image to form a nodal model of the portion of the operator's body that lies within the camera's field of view. Computer 104 can additionally execute programming to estimate the locations of features, e.g., hands, excluded or obscured from the field-of-view of the camera. In this context, a nodal model refers to a representation of an operator by a system of nodes connected by lines to represent body parts or features of the operator. The nodal model is an example of hands on-off detection (HOOD). Any suitable HOOD technology can be used with the techniques disclosed herein.

Computer 104 can further execute programming to determine whether the nodal model of the operator is consistent with a nodal model of an operator with one or more hands placed into contact with the steering wheel within a specified confidence level (e.g., greater than 95%). Conversely, responsive to determining that the nodal model of the operator is not consistent with a nodal model of an operator with one or more hands placed into contact with the steering wheel and/or the confidence level being below the specified confidence level, computer 104 can execute programming to actuate or generate a signal to indicate that one or more of the operator's hands are not in contact with steering wheel 124.

The nodal model is an example of a HOOD system that can also be used to detect spoofing. When the system has determined that the operator's hands are not in contact with the steering wheel 124, the system can measure steering wheel torque, which may be representative of the weight of a foreign object, e.g., water bottle, cup, computing device, etc., placed on the steering wheel which can be discounted as potential spoofing.

The disclosed systems and methods provide for adjusting an operator reengagement delay based on perception factors, such as path confidence, road type, and/or adjacent vehicles and controllability factors, such as lateral acceleration, road curvature, speed relative to limit, and/or operator engagement. Accordingly, the operator reengagement delay can be adjusted and/or can change over time, i.e., based on such factors. An operator reengagement delay refers to an amount of time between a last detection of an operator's hands being on a steering wheel and a subsequent operator reengagement notification and/or other vehicle action based on the passing of time from the last detection of the operator's hands being on the steering wheel.

The operator reengagement delay can be reset in response to a confirmation that the operator's hands are on the steering wheel. For example, hands-on detection can be based on a steering wheel capacitive sensor, steering wheel button interactions, and/or a specified amount of torque being applied to the steering wheel.

Perception factors refers to factors derived from data, including sensor data, that characterize an environment in which a vehicle is operating. Controllability factors refers to factors derived from data, including sensor data, that characterize a vehicle's operating dynamics. It can be appreciated that the environment in which a vehicle is operating, and the vehicle's operating dynamics can affect what ADAS features are available and when a vehicle's operator is to be reengaged if the environment and/or operating dynamics change.

In an example, an operator reengagement score is determined based on the perception factors and the controllability factors. The operator reengagement delay can be changed (e.g., increased) in proportion to a change (e.g., increase) in the reengagement score between a minimum delay of e.g., 15 seconds and a maximum delay of e.g., 30 seconds. For example, a base delay, e.g., 15 seconds, can be multiplied by the operator reengagement score.

In another example, if the operator reengagement score is below a threshold value, the system can set the delay to the minimum delay or to zero.

In a further example, the delay can default to the maximum value, e.g., 30 seconds, and be set to zero if certain control behavior is detected. Examples of control behavior resulting in zero delay can include entering a curve, environmental changes causing a loss in perception, drifting within a lane, and/or drifting out of a lane due to limited torque authority.

As noted above an operator reengagement score is determined based on multiple perception factors and multiple controllability factors. The perception factors can include one or more of path confidence, road type, and adjacent vehicle factors. The controllability factors can include one or more of lateral acceleration, road curvature, speed relative to limit, and operator engagement factors. Each of these factors can include one or more variables derived from data, which can include sensor data, such as data available on the vehicle network 106 (e.g., a CAN bus). Representative examples of these variables and techniques for how they can be derived from various sensors and/or data sources are provided below.

Path confidence can be quantified by scaling or ranking data pertaining to, e.g., lane line quality, weather conditions, and map data. For example, lane line quality can be determined from data captured by vehicle cameras, weather conditions can be determined from location-based (e.g., GPS) weather information, and map data can be determined from an onboard navigation system. The path confidence can be provided by an ADAS ECU, for example. In an example, each of these variables can be assigned a value based on a scale or rank. Weather conditions such as ice, snow, wet, and dry, can be ranked from 1 to 4, for example. The most favorable condition, i.e., dry, is assigned the highest value in the scale. Lane line quality and map data can be similarly quantified. All of these variables can be combined (e.g., summed and/or weighted) to derive a path confidence factor.

Road type can be quantified based on data identifying different types of roadways. For example, camera data, computer vision, and/or GPS data can be used to identify surface streets with two-way traffic, multiple carriageways, and limited access freeways. These different road types can be ranked from 1 to 3, for example, with surface streets being the least favorable and the limited access freeways being the most favorable.

Adjacent vehicles can be quantified by the number of surrounding vehicles, their relative position, and relative speed, for example. These variables can be determined with radar sensors, scanning laser range finders, cameras, ultrasonic sensors, and LIDAR, for example. Each of these variables can be assigned a relative value with favorable conditions, such as low speed, large spacing, and light traffic, having the highest values. All of these variables can be combined (e.g., summed and/or weighted) to derive an adjacent vehicle factor.

Lateral acceleration can be quantified based on vehicle accelerometer data, for example. When the vehicle is negotiating a tight curve, the steering torque to keep the vehicle centered in the lane may exceed the torque authority of the feature. Accordingly, high lateral acceleration can be assigned a low value.

Road curvature can also be quantified based on vehicle accelerometer data and/or vehicle camera data. While lateral acceleration focuses on the smaller radii of curvature, more gradual curves can be accounted for as well. Thus, the more gradual a curve is the higher it would be ranked. In another example, the road curvature factor can be calculated based on a measured radius of a curve.

Speed relative to speed limit can be quantified as the difference between vehicle speed and posted speed limit. The higher the vehicle's speed above the speed limit the lower the assigned value. If the vehicle's speed is at or below the posted limit the speed relative to speed limit factor can be set at a base value of 50, for example. The difference between vehicle speed and the posted speed limit can be subtracted from the base value.

Operator engagement can be determined by an operator facing camera to track an operator's eye position and/or monitor vehicle hands free calling as indicators of an operator's engagement. In some examples, operator engagement can be quantified by assigning each of these variables, e.g., eye position, calling, etc., a value if a favorable state is detected. For example, if the operator's gaze is determined to be on the road, a relatively high value is assigned and if the operator's gaze is on e.g., the infotainment system, a relatively low value is assigned. In another example, a driver engagement score can be derived from a driver state monitoring (DSM) system.

The operator reengagement score (ORS) can be determined by multiplying each of the multiple perception factors (PF) by a corresponding perception weight (PW), multiplying each of the multiple controllability factors (CF) by a corresponding controllability weight (CW), and then multiplying the weighted perception factors and the weighted controllability factors according to Equation 1:

$$ORS=(PF_1*PW_1)\times(PF_2*PW_2)\ldots(PF_N*PW_N)\times \\ (CF_1*CW_1)\times(CF_2*CW_2)\ldots(CF_N*CW_N) \tag{1}$$

In an alternative example, the weighted perception factors and the weighted controllability factors can be summed together according to Equation 2:

$$ORS=PF_1*PW_1+PF_2*PW_2\ldots PF_N*PW_N+ \\ CF_1*CW_1+CF_2*CW_2\ldots CF_N*CW_N \tag{2}$$

In an example, the perception weights and the controllability weights can be determined empirically. The perception weights and the controllability weights can also be selected based on the relative importance of each factor, which may also be determined empirically through testing. For example, test data can be collected for multiple drivers under different conditions for the different factors, such as road types, path confidences (e.g., may be in different environmental conditions), etc. regarding how much time a driver needs to reengage. These factors can then be weighted accordingly in the operator reengagement score algorithm.

Figure 2:
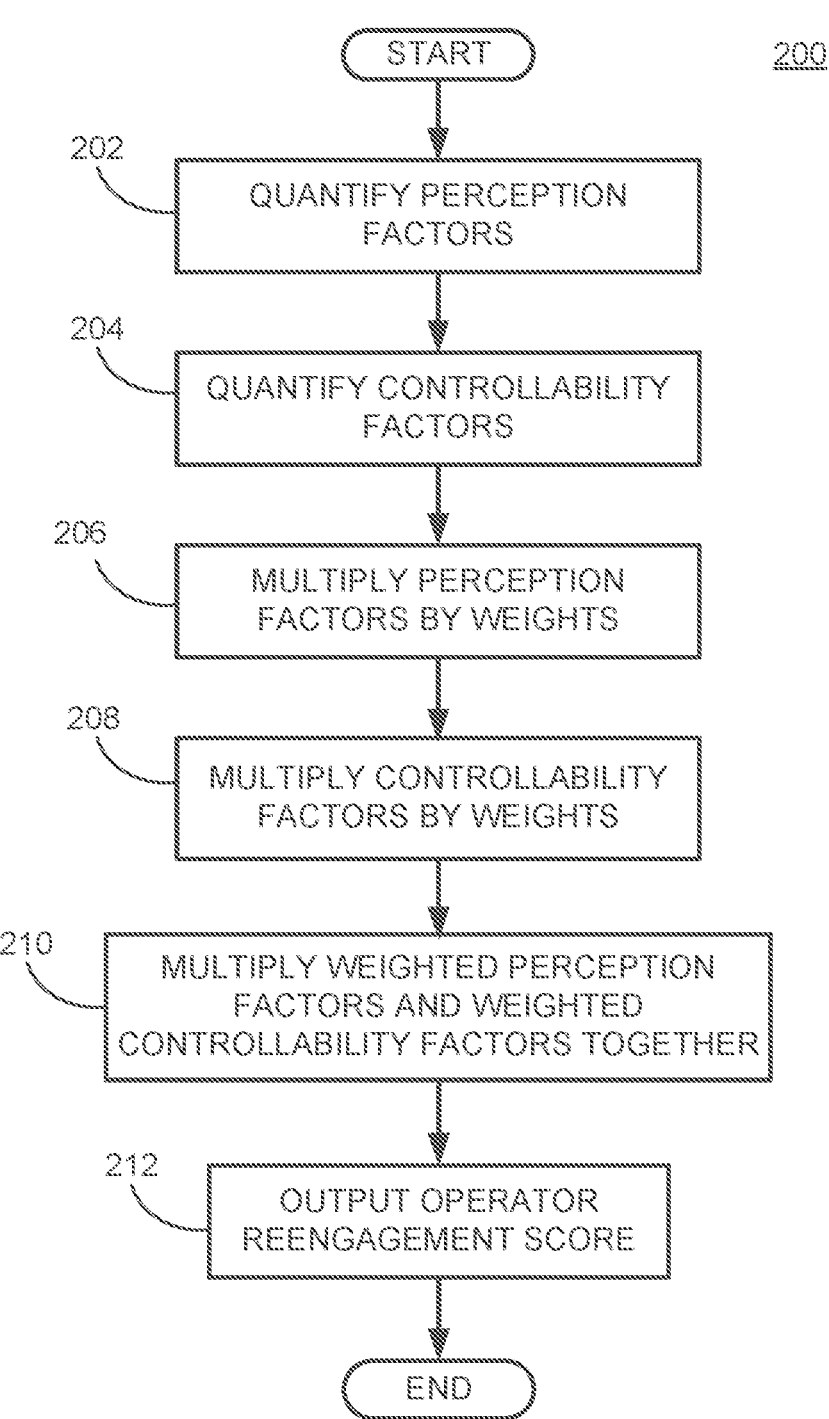
FIG. 2 is a process flow diagram illustrating an example process for determining an operator reengagement score.

FIG. 2 is a process flow diagram 200 illustrating an example process for determining an operator reengagement score. Process 200 can be implemented in a computer 104 included in a vehicle 102. Process 200 includes multiple blocks that can be executed in the illustrated order. Process 200 could alternatively or additionally include fewer blocks or include the blocks executed in different orders.

Figure 3A:
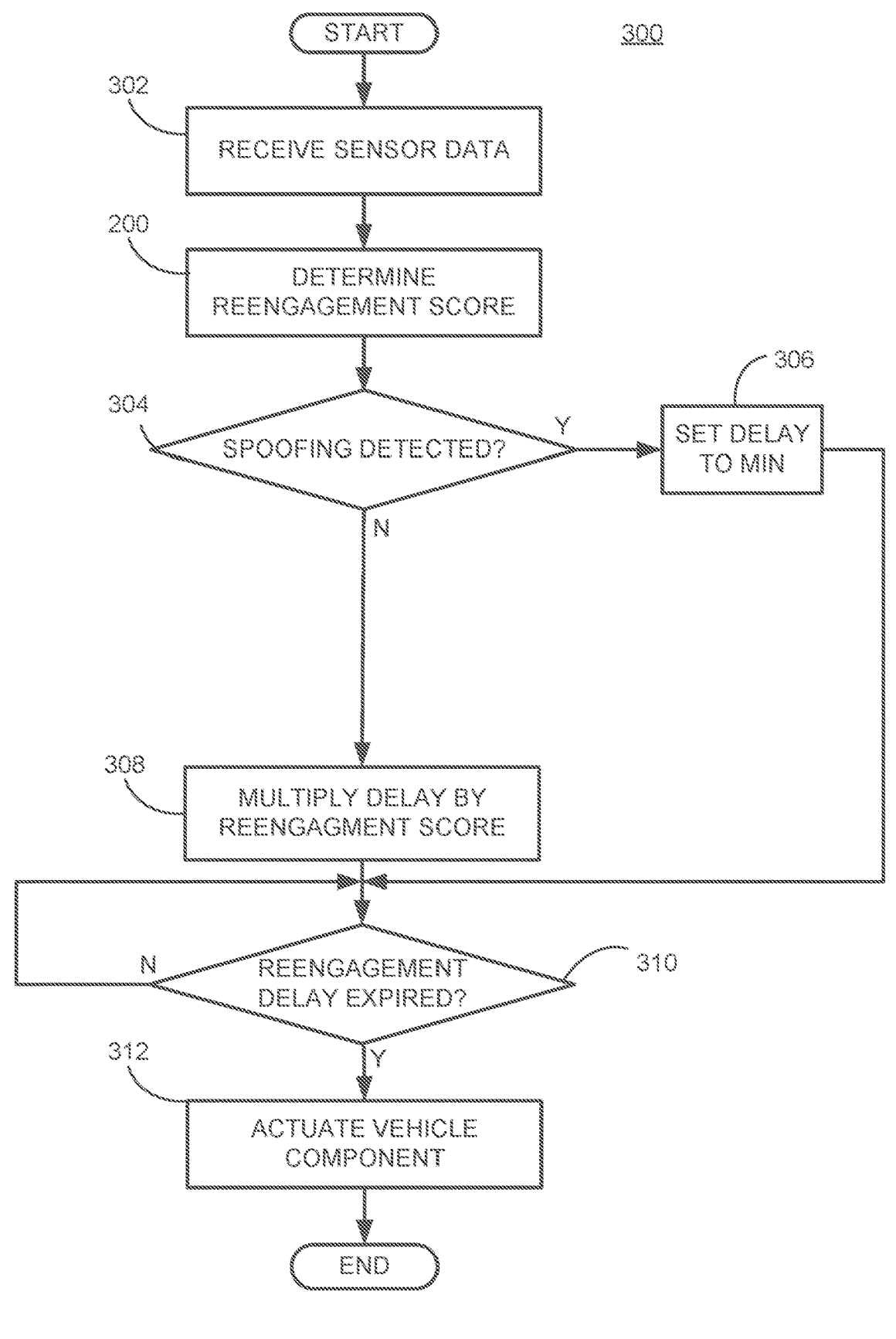
FIG. 3A is a process flow diagram illustrating an example process for adjusting operator reengagement timing.

Process 200 can begin at block 202, such as in response to receiving data from e.g., block 302 of a process 300 for using perception and controllability context to adjust an operator reengagement timing strategy (FIG. 3A).

At block 202 the computer 104 quantifies multiple perception factors and at block 204 the computer 104 quantifies multiple controllability factors as explained above.

At block 206 the computer 104 multiplies each of the multiple perception factors by a corresponding perception weight and at block 208 the computer 104 multiplies each of the multiple controllability factors by a corresponding controllability weight.

At block 210 the computer 104 multiplies the weighted perception factors and the weighted controllability factors together.

At block 212 the computer 104 outputs the operator reengagement score for use in adjusting an operator reengagement timing strategy in process 300, for example.

In some examples, the operator reengagement delay can be adjusted based on an operator's engagement history, e.g., reaction time to place their hands on the steering wheel. The system can build a historical profile of both how frequently an operator must be notified to reengage the steering wheel and how quickly the operator responds. Responsive operators (e.g., infrequent notifications with fast re-engagement) can have an extended maximum delay value. Less responsive operators (e.g., frequent notifications with slow reengagement) can have a reduced maximum delay value.

Many operator identification systems are key authenticator-based (e.g., fob or phone). These systems typically do not account for operators sharing a key. In an example, biometric verification can be used to confirm an operator's identity when adjusting operator reengagement delay based on an operator's engagement history. Using the vehicle's operator facing camera a face-recognition check can be performed to access the correct operator profile. Alternatively, the operator can be prompted to confirm their identity using speech-recognition via the HMI, for example.

Operators may attempt to spoof HOOD systems through an artificial torque source such as adding a weight to the steering wheel. Hands-on spoof detection can be performed by observing a lack of variance in the wheel torque inputs, and/or by the operator facing camera and a nodal model as discussed above. When spoofing is detected, the delay can be set to the minimum delay or to zero, for example. Should the operator have a history of spoofing the system, their maximum delay time can be shortened.

In some examples, the operator reengagement score can be intelligently modeled using re-enforcement learning. A basic model can be deployed to infer whether a reengagement delay will expire, followed with a second model to infer how long it takes for re-engagement. These models are then rewarded by the HOOD system. A positive reward (e.g., re-enforce the inferred times) is given to minimize the difference of inferred time versus actual time for the predicted event.

FIG. 3A is a process flow diagram 300 illustrating an example process for using perception and controllability context to adjust an operator reengagement timing strategy. Process 300 can be implemented in a computer 104 included in a vehicle 102. Process 300 includes multiple blocks that can be executed in the illustrated order. Process 300 could alternatively or additionally include fewer blocks or include the blocks executed in different orders.

Process 300 can begin at block 302, such as in response to vehicle 102 being placed into an ON state, or in a "drive" state to operate on a roadway, for example. In an example, process 300 can begin at block 302, such as in response to detection that an operator's hands are not in contact with the steering wheel.

At block 302 the computer 104 receives data including sensor data from e.g., vehicle sensors 108 that can be used to determine multiple perception factors and multiple controllability factors. The sensors can include cameras, accelerometers, GPS, radar sensors, scanning laser range finders, LIDAR, and torque sensors to name a few examples.

At block 200 (FIG. 2) the computer 104 determines an operator reengagement score based on the data from block 302, including the perception factors and the controllability factors. The perception factors and the controllability factors are quantified based on the data and weighted with corresponding weighting factors. The weighted perception factors and the weighted controllability factors are then multiplied together to determine the operator reengagement score.

At decision block 304 the computer 104 determines whether spoofing has been detected. In response to an indication that spoofing has been detected the operator reengagement delay is set to the minimum delay at block 306. Otherwise, the process 300 proceeds to block 308.

At block 308 the computer 104 adjusts the operator reengagement delay based on the reengagement score. The operator reengagement delay can be adjusted in proportion to a change in the reengagement score between a minimum delay and a maximum delay. For example, the operator engagement delay can be multiplied by the reengagement score from block 200. In another example, if the minimum delay is 15 seconds and the maximum delay is 30 seconds and the reengagement score is determined to be 50 on a scale of e.g., 0-100, the operator reengagement delay can be increased from 15 seconds to approximately 22.5 seconds, which is 50% of the delay range.

At decision block 310 the computer 104 determines whether the operator reengagement delay has expired. If the delay has expired, a vehicle component is actuated at block 312. Otherwise, the process returns to decision block 310 until the delay has expired.

At block 312 the computer 104 actuates a vehicle component upon expiration of the operator reengagement delay. The vehicle component can be an operator reengagement indicator, such as an audible or visual indicator and/or a tactile indicator. In an example, the vehicle component can be a vehicle braking system and/or steering system.

After block 312, process 300 ends.

Figure 3B:
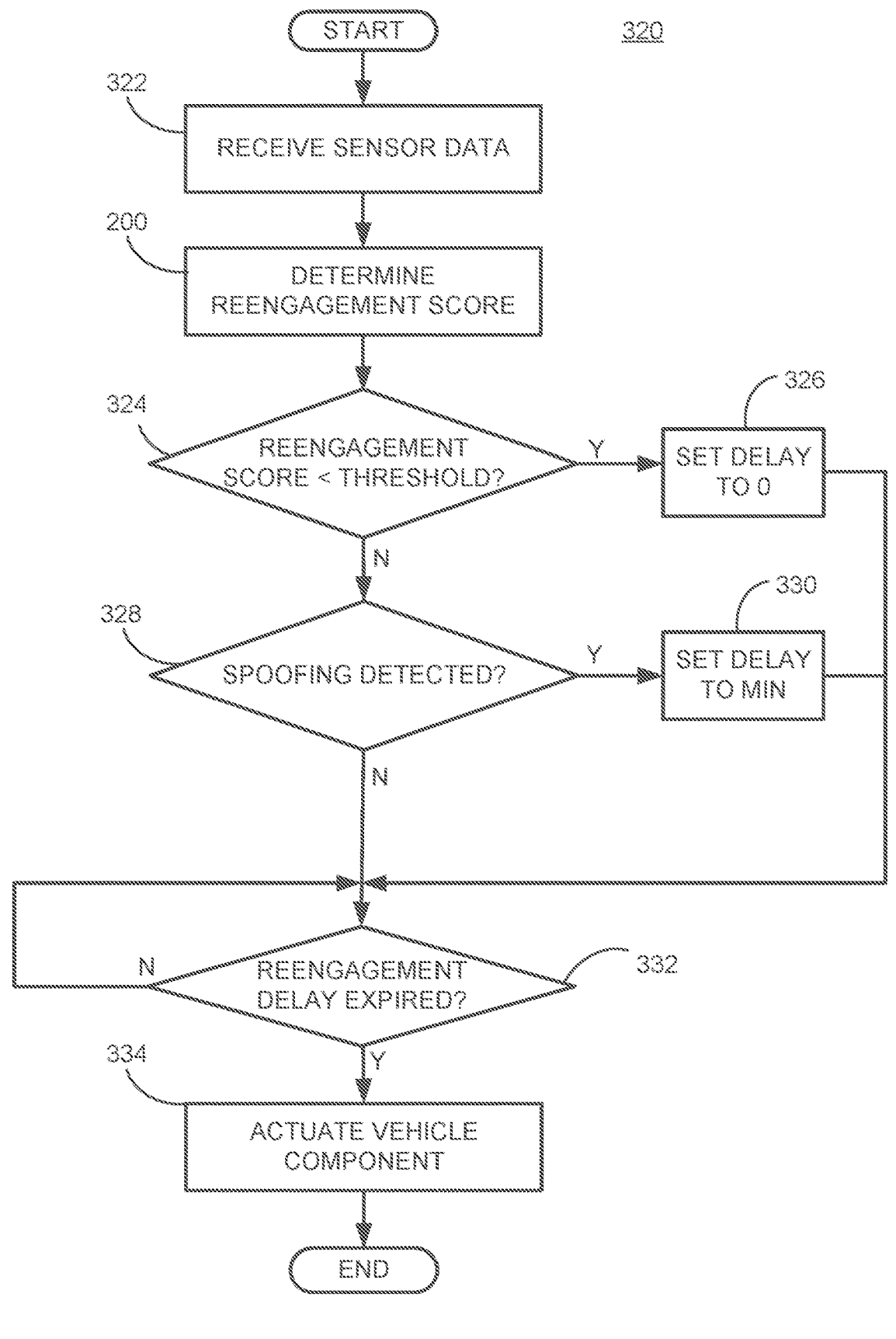
FIG. 3B is a process flow diagram illustrating an alternative example process for adjusting operator reengagement timing.

FIG. 3B is a process flow diagram 320 illustrating an alternative example process for using perception and controllability context to adjust an operator reengagement timing strategy. Process 320 can be implemented in a computer 104 included in a vehicle 102. Process 320 includes multiple blocks that can be executed in the illustrated order. Process 320 could alternatively or additionally include fewer blocks or include the blocks executed in different orders.

Process 320 can begin at block 322, such as in response to vehicle 102 being placed into an ON state, or in a "drive" state to operate on a roadway, for example. In an example, process 320 can begin at block 322, such as in response to detection that an operator's hands are not in contact with the steering wheel.

At block 322 the computer 104 receives data including sensor data from e.g., vehicle sensors 108 that can be used to determine multiple perception factors and multiple controllability factors. The sensors can include cameras, accelerometers, GPS, radar sensors, scanning laser range finders, LIDAR, and torque sensors to name a few examples.

At block 200 (FIG. 2) the computer 104 determines an operator reengagement score based on the data from block 322, including the perception factors and the controllability factors. The perception factors and the controllability factors are quantified based on the data and weighted with corresponding weighting factors. The weighted perception factors and the weighted controllability factors are then multiplied together to determine the operator reengagement score.

At decision block 324 the computer 104 determines if the reengagement score from block 200 is less than a threshold value. If the reengagement score is less than the threshold value, the operator reengagement delay is set to zero at block 326 and the process proceeds to decision block 332. Otherwise, the process 320 proceeds to decision block 328. In some examples, the threshold value is determined empirically through testing and/or simulation.

At decision block 328 the computer 104 determines whether spoofing has been detected. In response to an indication that spoofing has been detected the operator reengagement delay is set to the minimum delay at block 330. Otherwise, the process 320 proceeds to decision block 332.

At decision block 332 the computer 104 determines whether the operator reengagement delay has expired. If the delay has expired, a vehicle component is actuated at block 334. Otherwise, the process returns to decision block 332 until the delay has expired.

At block 334 the computer 104 actuates a vehicle component upon expiration of the operator reengagement delay. The vehicle component can be an operator reengagement indicator, such as an audible or visual indicator and/or a tactile indicator. In an example, the vehicle component can be a vehicle braking system and/or steering system.

After block 334, process 320 ends.

Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain examples and should in no way be construed so as to limit the claims.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C++, Visual Basic, Java Script, Perl, Python, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

What is claimed is:

1. A system, comprising:

a computer that includes a processor and a memory, the memory including instructions executable by the processor to:

determine an operator reengagement score based on sensor data including multiple perception factors and multiple controllability factors, wherein the instructions to determine the operator reengagement score include one or both of (a) instructions to multiply each of the multiple perception factors by a corresponding perception weight, and then multiply the weighted perception factors together and (b) instructions to multiply each of the multiple controllability factors by a corresponding controllability weight, and then multiply the weighted controllability factors together;

adjust an operator reengagement delay based on the operator reengagement score; and actuate a vehicle component upon expiration of the operator reengagement delay.

2. The system of claim 1, wherein the perception factors include one or more of path confidence, road type, and adjacent vehicles.

3. The system of claim 1, wherein the controllability factors include one or more of lateral acceleration, road curvature, speed relative to limit, and operator engagement.

4. The system of claim 1, wherein the instructions to adjust the operator reengagement delay include instructions to change the operator reengagement delay in proportion to a change in the operator reengagement score between a minimum delay and a maximum delay.

5. The system of claim 1, wherein the instructions to adjust the operator reengagement delay include instructions to set the operator reengagement delay to zero when the operator reengagement score is below a threshold value.

6. The system of claim 5, wherein the instructions further include instructions to receive an indication that spoofing is detected and in response to the indication set the operator reengagement delay to the minimum delay.

7. The system of claim 1, wherein the instructions to determine the operator reengagement score include instructions to multiply the weighted perception factors and the weighted controllability factors together.

8. The system of claim 1, wherein the perception weights and the controllability weights are determined empirically.

9. The system of claim 1, wherein the instructions to adjust the operator reengagement delay include instructions to change the operator reengagement delay in proportion to a change in the operator reengagement score between a minimum delay and a maximum delay.

10. The system of claim 1, wherein the vehicle component is an operator reengagement indicator.

11. The system of claim 1, wherein the vehicle component is a vehicle brake.

12. A method, comprising:

determining an operator reengagement score based on sensor data including multiple perception factors and multiple controllability factors, wherein determining the operator reengagement score includes one or both of (a) multiplying each of the multiple perception factors by a corresponding perception weight, and then multiplying the weighted perception factors together and (b) multiplying each of the multiple controllability factors by a corresponding controllability weight, and then multiplying the weighted controllability factors;

adjusting an operator reengagement delay based on the operator reengagement score; and actuating a vehicle component upon expiration of the operator reengagement delay.

13. The method of claim 12, wherein adjusting the operator reengagement delay includes changing the operator reengagement delay in proportion to a change in the reengagement score between a minimum delay and a maximum delay.

14. The method of claim 12, wherein the vehicle component is an operator reengagement indicator.

15. The method of claim 12, further comprising receiving an indication that spoofing is detected and in response to the indication setting the delay to the minimum delay.

16. The method of claim 15, wherein adjusting the operator reengagement delay includes setting the delay to zero when the reengagement score is below a threshold value.

17. A system, comprising:

a computer that includes a processor and a memory, the memory including instructions executable by the processor to:

determine an operator reengagement score based on sensor data including multiple perception factors and multiple controllability factors;

adjust an operator reengagement delay based on the operator reengagement score, wherein the instructions to adjust the operator reengagement delay include instructions to change the operator reengagement delay in proportion to a change in the operator reengagement score between a minimum delay and a maximum delay; and actuate a vehicle component upon expiration of the operator reengagement delay.

18. The system of claim 17, wherein the instructions to determine the operator reengagement score include instructions to multiply each of the multiple perception factors by a corresponding perception weight, and then multiply the weighted perception factors together.

19. The system of claim 17, wherein the instructions to determine the operator reengagement score include instructions to multiply each of the multiple controllability factors by a corresponding controllability weight, and then multiply the weighted controllability factors together.

20. The system of claim 17, wherein the instructions to determine the operator reengagement score include instructions to:

multiply each of the multiple perception factors by a corresponding perception weight;

multiply each of the multiple controllability factors by a corresponding controllability weight; and multiply the weighted perception factors and the weighted controllability factors together.

* * * * *